United States Patent [19]

Skillman

[11] 4,308,858
[45] Jan. 5, 1982

[54] SOLAR ENERGY COLLECTING APPARATUS AND METHODS

[76] Inventor: Dale N. Skillman, P.O. Box 1311, Rapid City, S. Dak. 57709

[21] Appl. No.: 89,100

[22] Filed: Oct. 29, 1979

[51] Int. Cl.³ .............................................. F24J 3/00
[52] U.S. Cl. .................................. 126/450; 126/444; 126/418
[58] Field of Search ............... 126/429, 431, 444, 449, 126/437, 450

[56] References Cited

U.S. PATENT DOCUMENTS

| | | | |
|---|---|---|---|
| 3,994,276 | 11/1976 | Pulver | 126/431 |
| 4,046,133 | 9/1977 | Cook | 126/429 |
| 4,098,260 | 7/1978 | Goetti | 126/429 |
| 4,197,833 | 4/1980 | Pelish | 126/450 |
| 4,207,868 | 6/1980 | Peterson | 126/449 |
| 4,238,912 | 12/1980 | MacDonald | 126/450 |

*Primary Examiner*—Samuel Scott
*Assistant Examiner*—G. Anderson
*Attorney, Agent, or Firm*—Ancel W. Lewis, Jr.

[57] ABSTRACT

In solar energy collecting apparatus the problems of leakage due to differential thermal expansion and contraction between different parts of the collector, duplication of parts, fixed factory costs, and the unnecessary use of expensive materials are solved by using collector members made using on-site roll-forming machines, the assembly of parts at the job site, and collector members that connect side by side, each having a sheet metal collector plate (11) as the principal part of a weather membrane above underlying support structure. A unique cover (13) and method of forming the cover enable use of relatively inexpensive film that is supported on side supports held to a pair of opposed sidewall portions (18 and 19) of a collector panel (31) so as to accommodate ready replacement of covers for individual collector members and ready attachment by joiner strips in an assembly of the collector members connected side by side. A pair of opposed sidewall portions (23 and 24) of a bottom panel are longitudinally slidable in opposed attachment members (78) rigidly secured to the underlying support structure (71 and 72) and have a bottom wall (15) connected to the ends of the lower passage to form an air passage to transfer heat from the collector plate. The collector plate (11) is suspended from the support structure to allow for relative expansion and contraction of the collector plate and associated collector member structure due to temperature changes.

30 Claims, 14 Drawing Figures

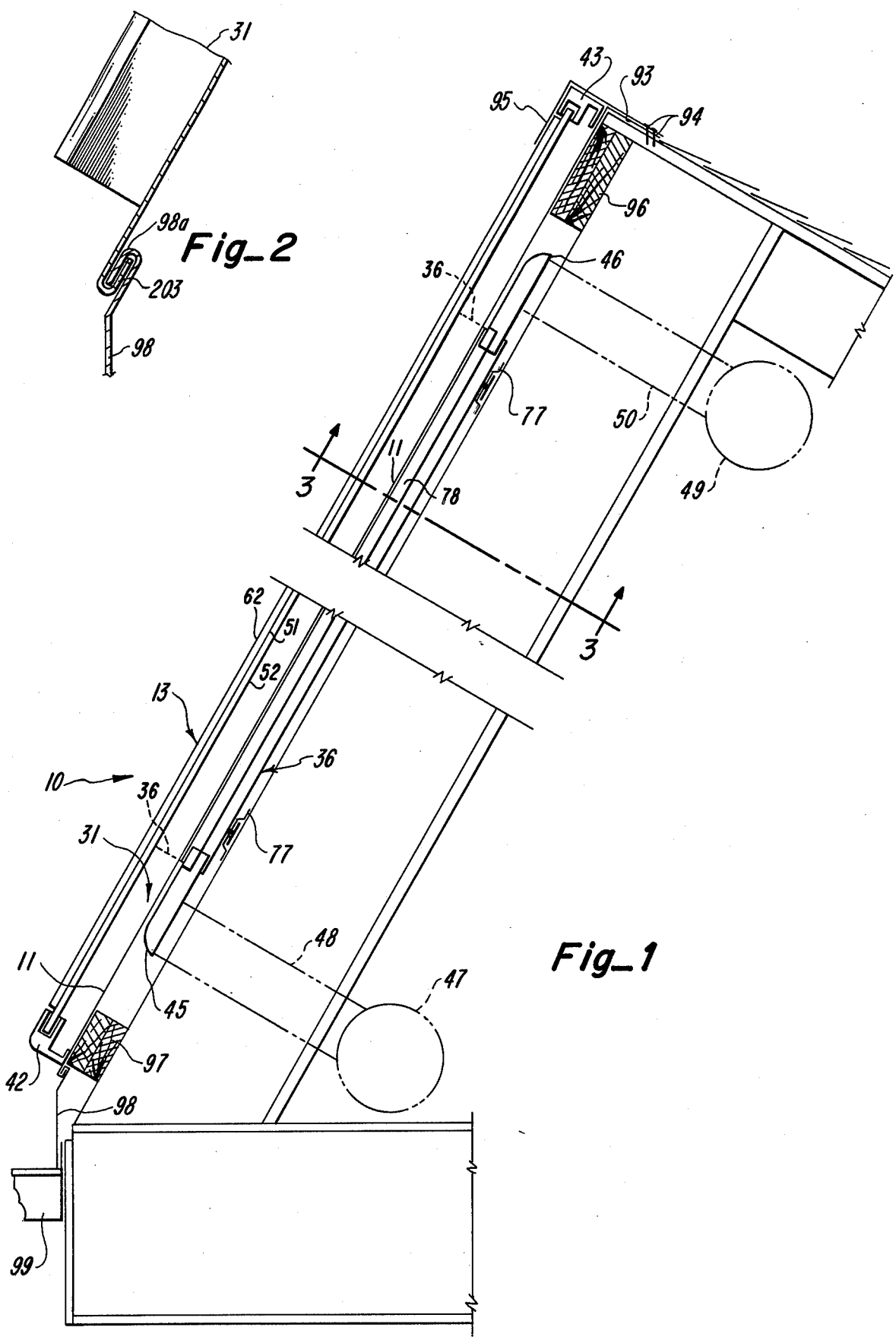

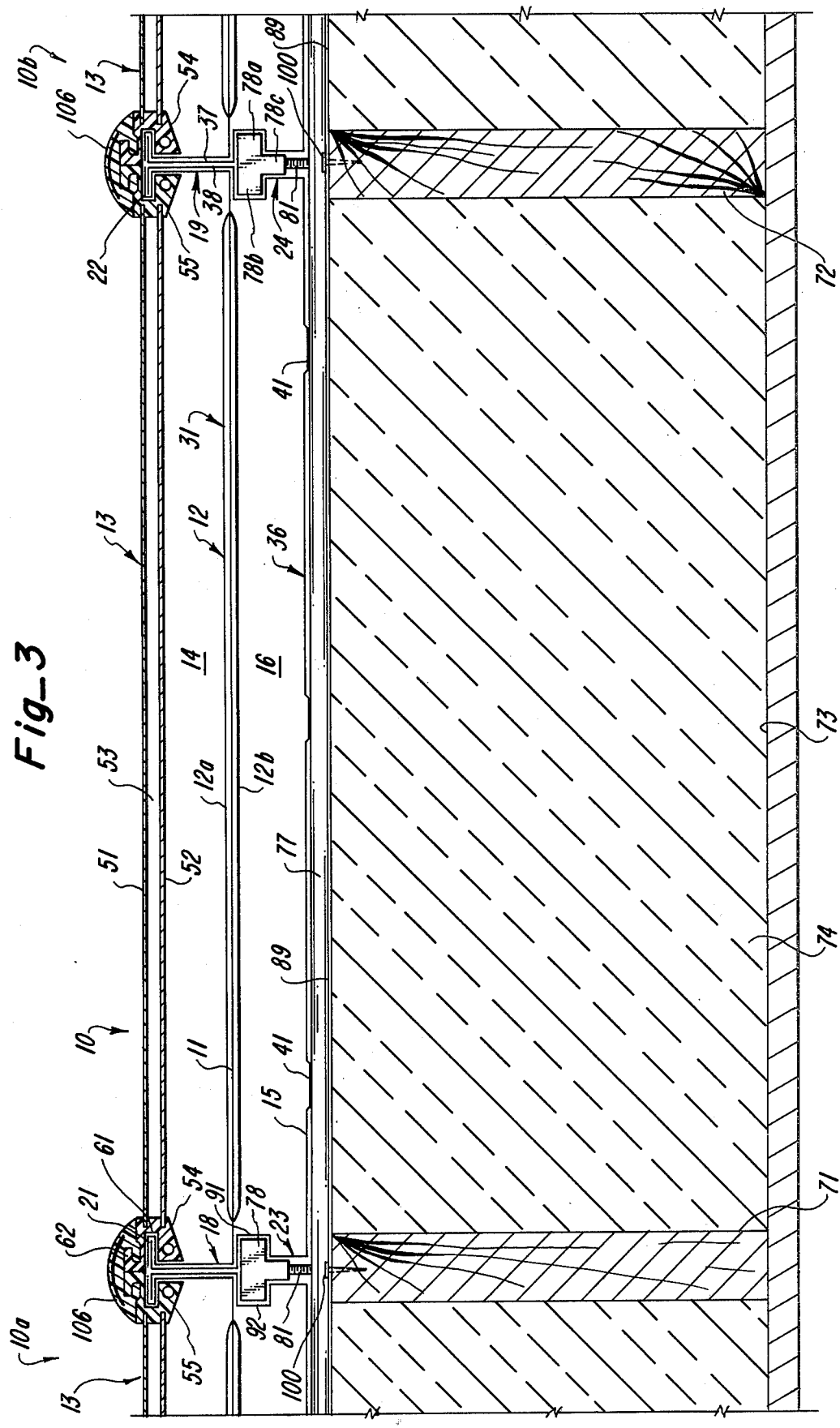

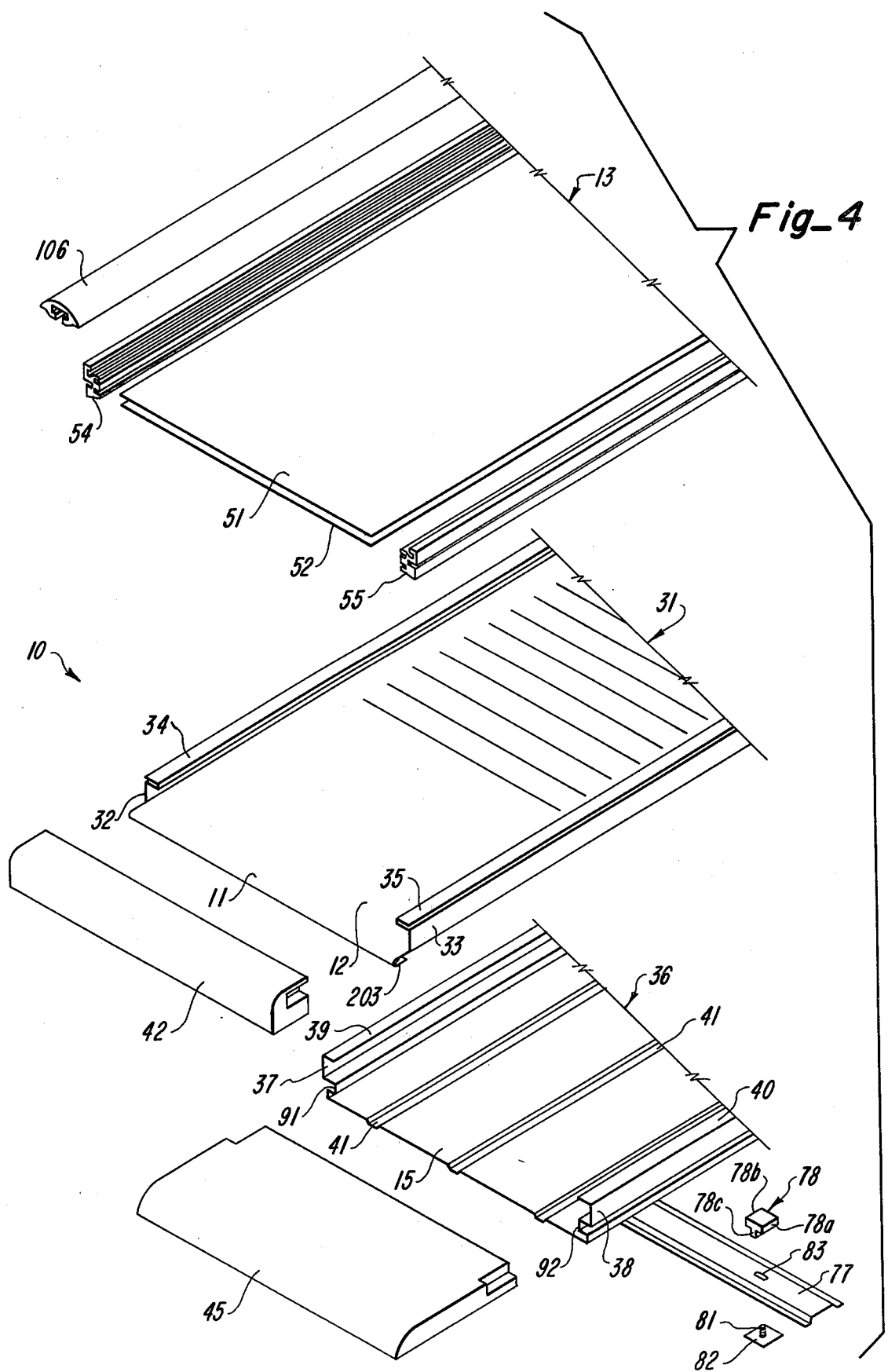

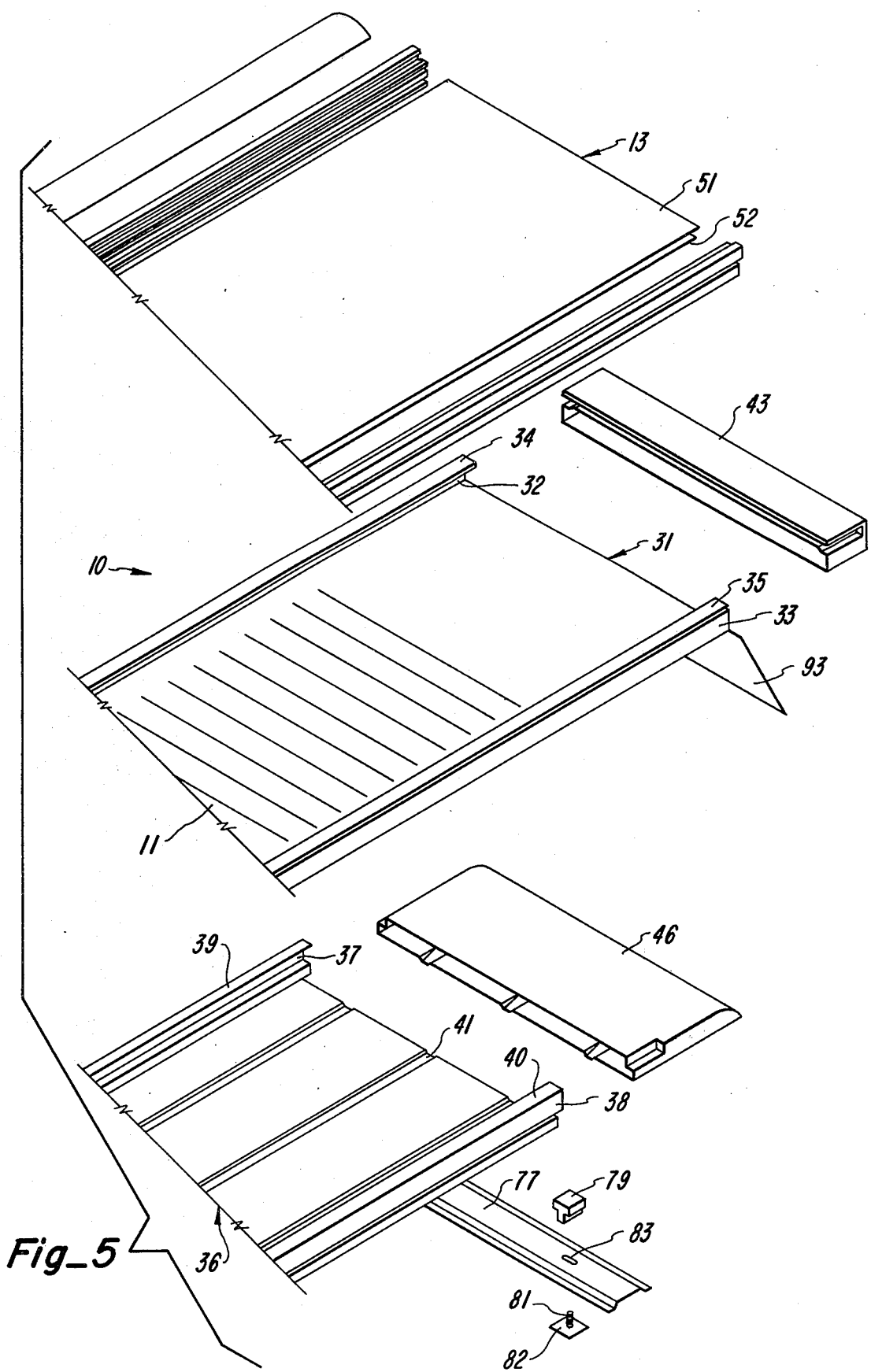
Fig_5

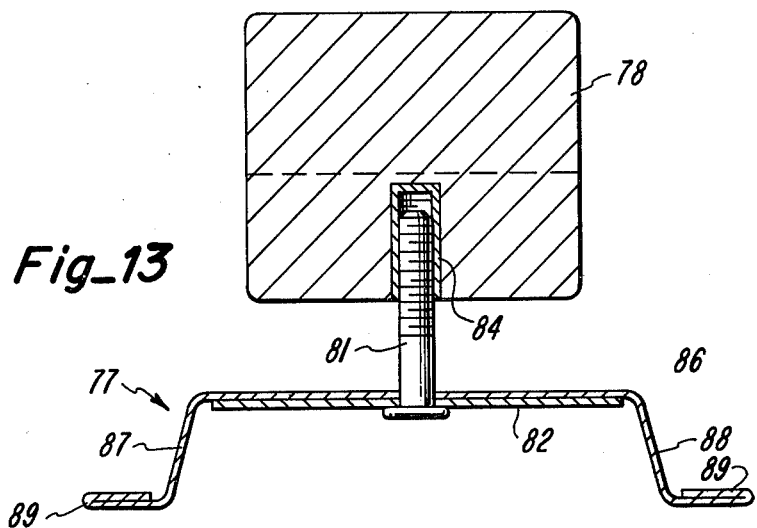
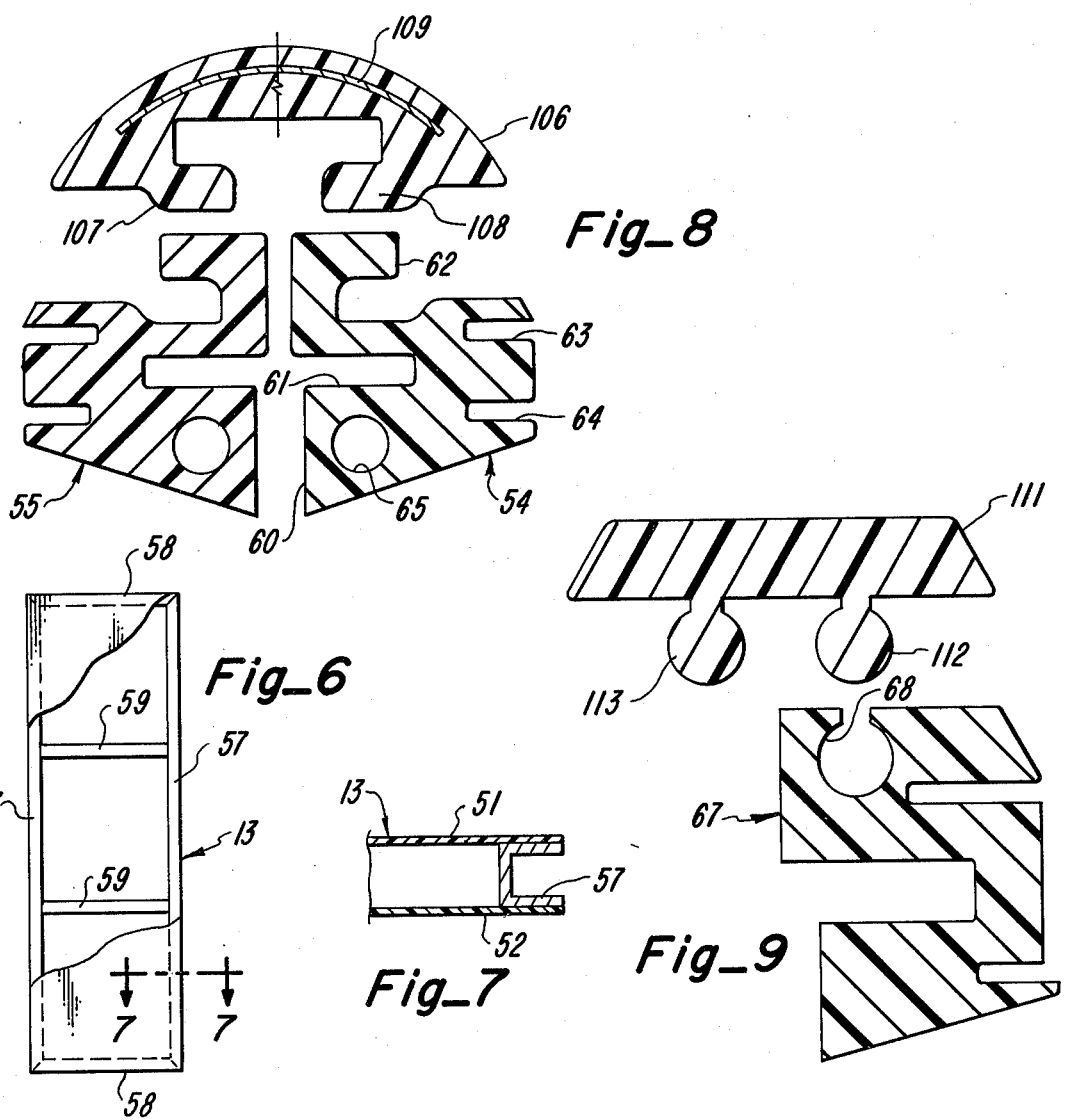
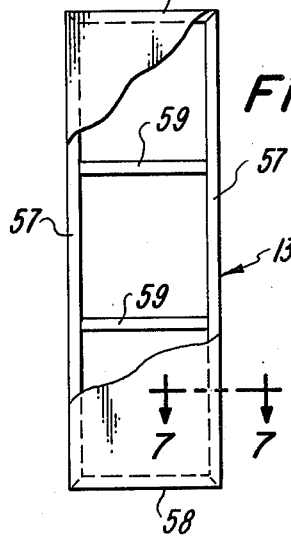
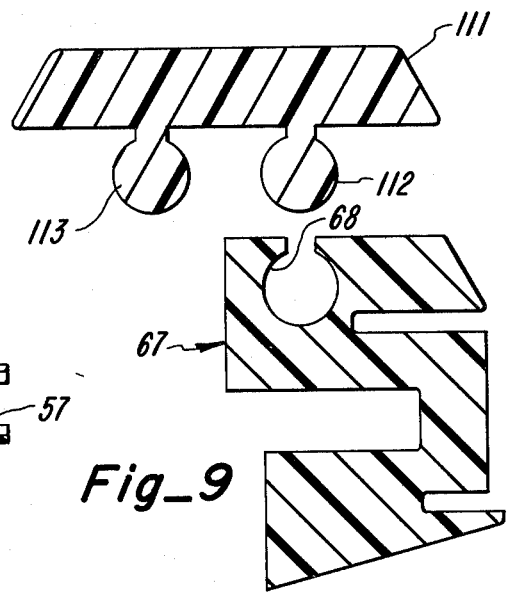

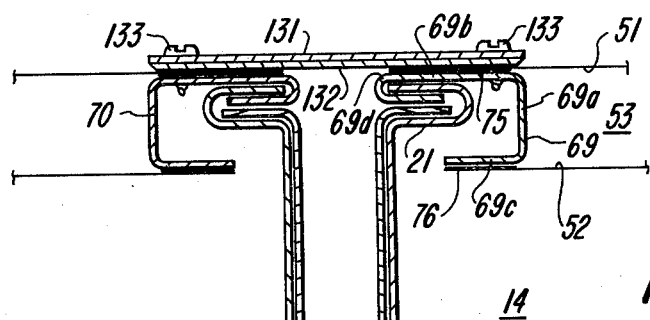
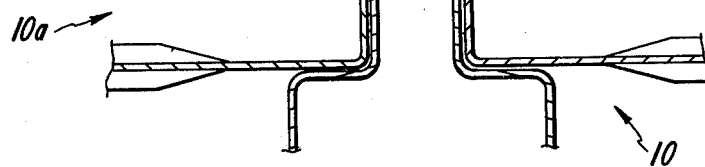
Fig_10
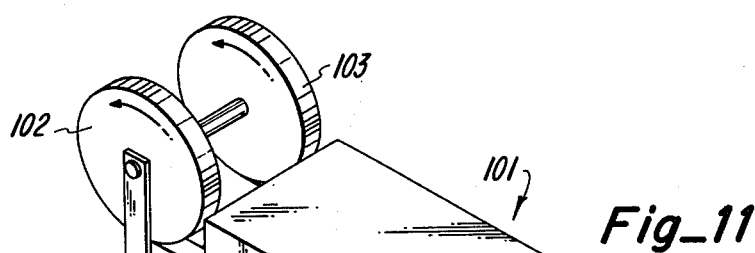
Fig_11
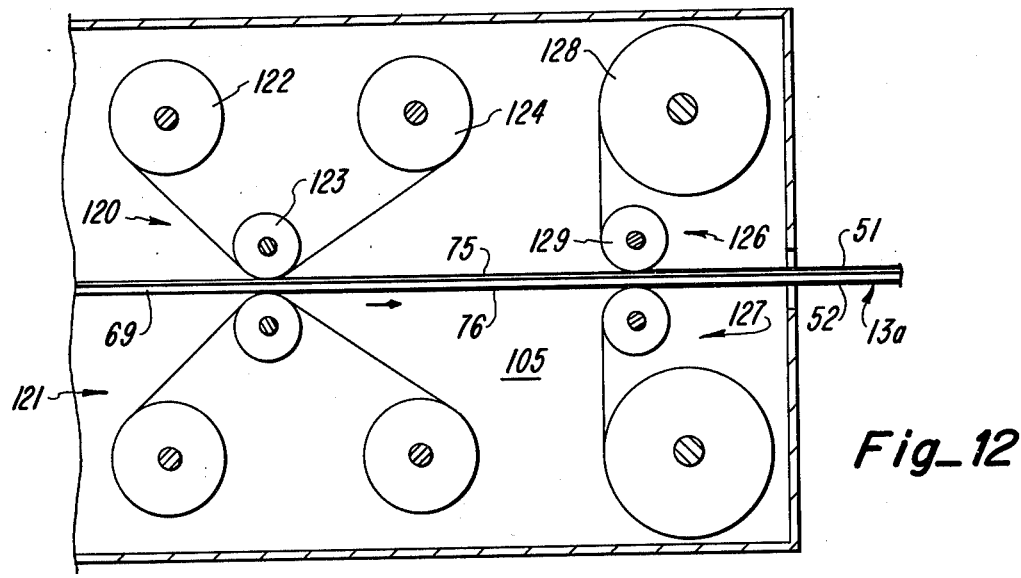
Fig_12

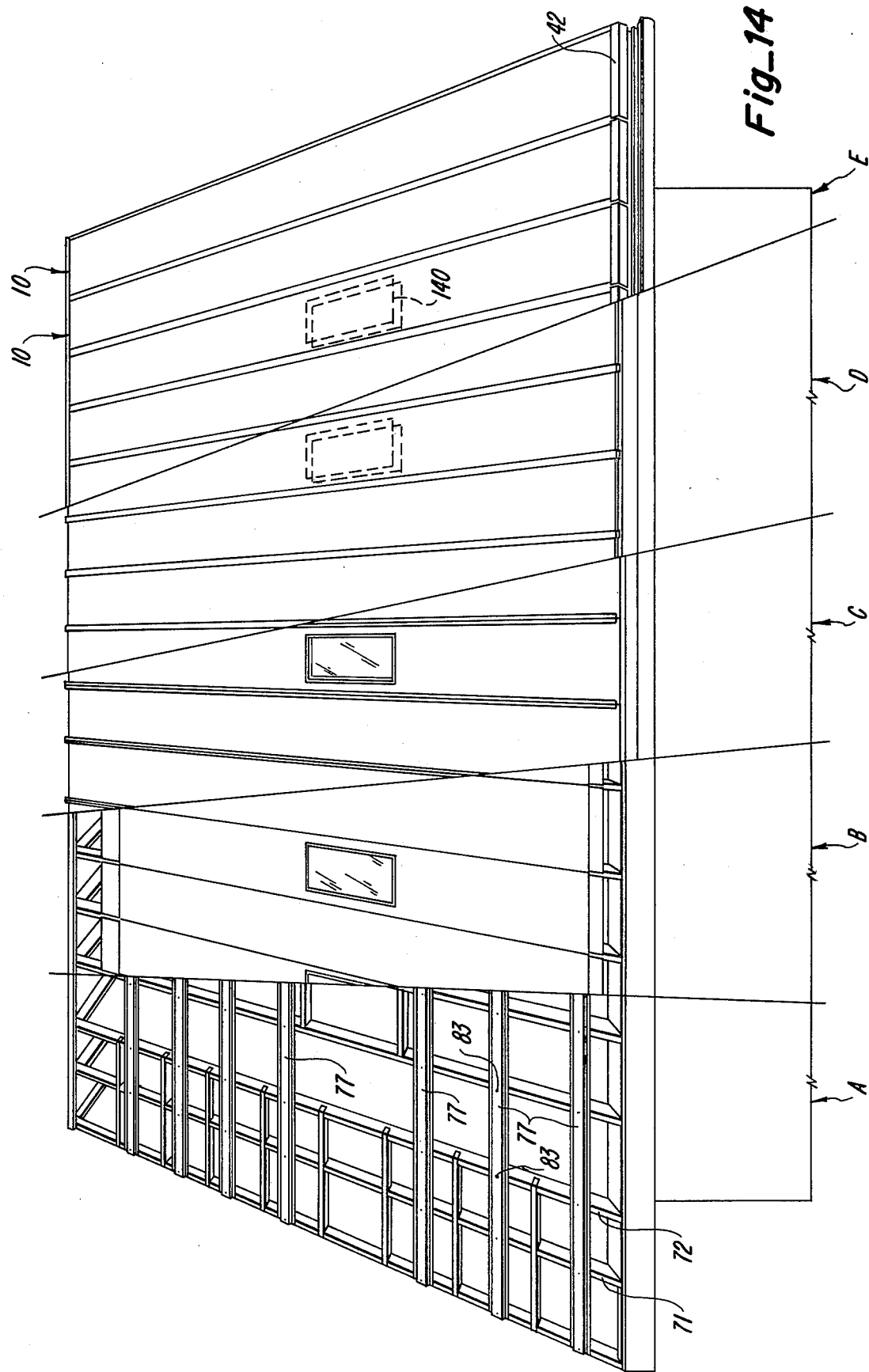

SOLAR ENERGY COLLECTING APPARATUS AND METHODS

TECHNICAL FIELD

This invention relates to a novel and improved solar energy collecting apparatus and methods.

BACKGROUND ART

Presently known fixed flat plate type solar collectors that are built at the job site are so firmly attached to or integrated into the support structure in such a way that they fail to provide for a satisfactory differential thermal expansion between the collector and the underlying support structure. Such rigidity of attachment results in leakage. Presently known modular factory built type solar collectors have the disadvantages of unnecessary duplication of materials and the use of relatively expensive materials.

Attempts have been made to save materials by the use of flat plate collectors as a cover for the underlying structure but presently known collectors of this type rigidly affix some part to the rafters or equivalent support structures and thereby do not allow for differential expansion between the collector and underlying structure. In particular, in the prior art the cover is rigidly affixed to the top of the rafters and the collector plate and underlying fluid flow pan are recessed below the rafters. This arrangement demonstrates an inability to maintain the integrity of the weather membrane, is difficult to service, and has reduced the area behind the collector plate that is available for insulation.

Moreover, known solar collectors that are of the modular type are built in a factory location remote from the point of use. The apparatus of the present invention is particularly suited for being fabricated at the job site, thereby affording a number of advantages over factory built modules and presently known site built systems. These advantages include an ability to expand and contract relative to the support structure, an assembly that is tailored to fit the structure on which it is mounted, and a high degree of quality control.

DISCLOSURE OF INVENTION

Solar energy collecting apparatus in which a collector member has an imperforate collector plate, preferably of sheet metal with upright sidewalls and side connecting flanges to connect similar members side by side so that the collector plate serves as both a collector for solar energy and as a part of a weather membrane over supporting structure. The collector member has a cover above the collector plate and a lower panel below the collector plate and none of these elements is directly or rigidly secured to the support structure so as to allow for differential expansion between the collector member and the support structure. The lower panel below the collector plate is attached to the support structure by means of a rail-like guide assembly so as to allow for differential expansion and contraction due to temperature changes. The cover utilizes an outer sheet and an inner sheet, preferably a thin film supported along opposite side edges by parallel spaced side supports adapted to detachably mount on the collector member, and the collector members readily fasten side by side in an assembly of the collector members. Also disclosed is apparatus and a method of forming the covers.

BRIEF DESCRIPTION OF DRAWINGS

FIG. 1 is a longitudinal sectional view through the center of a solar collector member mounted to and forming an integral part of the roof of a building, embodying features of the present invention;

FIG. 2 is an enlarged side elevational view, partially in section, showing the lapping edges of the bottom panel and the eave flashing strip;

FIG. 3 is a transverse cross-sectional view taken along lines 3—3 of FIG. 1 showing an assembly of one solar collector member and portions of two other collector members connected side by side;

FIG. 4 is an exploded perspective view of one end portion of a solar collector member;

FIG. 5 is an exploded perspective view of the other end portion of the solar collector member;

FIG. 6 is a top plan view of a cover demounted from the collector member;

FIG. 7 is a sectional view taken along lines 7—7 of FIG. 6;

FIG. 8 is an end view of two side connecting members and a joiner strip used in the apparatus shown in FIGS. 1-7;

FIG. 9 is an alternative form of side connecting members and joiner strip;

FIG. 10 is a cross-sectional view of an alternative form of cover connected at an alternative form of connecting joint between two adjacent installed collector members;

FIG. 11 is a perspective view of roll-forming apparatus suitable for forming the cover shown in FIG. 10;

FIG. 12 is a schematic diagram showing apparatus for forming the cover shown in FIG. 10;

FIG. 13 is an enlarged sectional view of the purlin and attachment members; and

FIG. 14 is a top view showing several stages of assembly into the roof of the solar energy collecting apparatus of the present invention.

DETAILED DESCRIPTION

Referring now to FIGS. 1-5, a solar collector member 10 shown is generally comprised of a substantially flat collector plate 11 having a solar energy absorber surface 12 which is provided by an intermediate wall portion of a channel-shaped top collector panel 31, a glazing or cover 13 disposed above and in spaced relation to the absorber surface to provide a dead air space 14 in front of plate 11, and a bottom wall 15 disposed below and in spaced relation to the collector plate 11 which is provided by an intermediate portion of a channel-shaped bottom panel 32 to form a fluid passage or fluid chase 16 back of plate 11. The collector panel 31 has a pair of oppositely disposed, spaced, upper sidewalls 18 and 19 extending up from and along the opposite side edges the intermediate portion forming plate 11 having inturned top flanges 21 and 22, respectively. The bottom panel 32 has a pair of oppositely disposed, spaced, lower sidewalls 23 and 24 extending up from along the opposite side edges of the intermediate portion forming bottom wall 15. The cover 13 has opposite side edges connected to the upper ends of the upper sidewalls 18 and 19 and the bottom wall 15 has side edges connected to the lower ends of the lower sidewalls 23 and 24.

The collector member 10 is particularly suited for the use of site-built sheet metal roll-forming techniques and as shown is constructed from a generally channelshaped structural top panel 31 having a generally flat intermediate wall portion providing the collector plate 11, together with a pair of parallel spaced, upstanding sidewall portions 32 and 33. Sidewall portion 32 has a generally U-shaped, outwardly facing, inturned top flange portion 34 and sidewall portion 33 has a generally U-shaped outwardly facing, inturned top flange portion 35.

The absorber surface 12 preferably is corrugated with or horizontally ribbed with upper and lower transverse corrugations that extend alternately above and below the plane of the panel substantially throughout its length, as indicated at 12a and 12b, respectively in FIG. 3.

Below the top panel 31 there is provided a generally channel-shaped structural bottom panel 36 having a substantially flat intermediate wall portion providing the bottom wall 15 and a pair of upstanding sidewall portions 37 and 38 extending up from the outer side edges of the intermediate wall portion and having inturned top flanges 39 and 40 at the upper ends of sidewall portions 37 and 38, respectively. The bottom wall 15 is shown formed with three laterally spaced, longitudinally extending ribs 41 to increase stiffness and belly the bottom panel out across the bottom when the panel is initially formed. The belly is eliminated when the bottom panel is attached to the purlin. This creates a positive pressure between the panel and the purlin so as to eliminate vibration between the bottom panel and the purlin.

In the assembled collector member, as best shown in FIG. 3, the top panel 31 nests in the bottom panel 36 and the inturned top flange portions 39 and 40 of the bottom panel nest in associated U-shaped inturned top flange portions 34 and 35, respectively, of the top panel. Normally the flange portions 39 and 40 are in a close-fitting relationship in flange portions 34 and 35, which allows for relative sliding movement therebetween, and need not be rigidly clamped together, although for some applications a tight continuous seam may be formed as required. The collector member thus is a double channel-shaped panel structure that is essentially box-like to provide considerable strength with the upper sidewalls 18 and 19 above the collector plate 11 having a double-wall thickness and the inturned top flanges 21 and 22 having a triple-wall thickness.

A preferred method of forming the top panel 31 is to continuously roll-form the panel into the shape shown from a flat metal sheet, preferably about 0.027 inch aluminum stock with a preapplied selective absorber coating having high absorbtivity and low emissivity to form a selective absorber surface 12. The bottom panel 36 is also continuously roll-formed from a flat aluminum sheet of the same thickness into the shape shown. The apparatus used is portable equipment that is transported to the job site.

The end boundaries of the dead air space 14 are provided by a bottom end closure 42 and a top end closure 43. These end closures are shown as solid bodies that are sized and shaped with notches so as to be complementary in shape with the ends of the top panel to enable them to be slid into and mate with the walls at the open ends of the top panel 31 and between the cover 13 and the collector plate 11 to close the ends of air space 14 and to secure the end of the cover 13. These end closures may be formed of stamped metal or a molded dielectric material and, as such, add to the thermal performance by reducing the amount of heat lost by natural convection between the collector plate and cover and between the two sheets of the cover.

The fluid flow passage 16 has a bottom duct connector 45 and a top duct connector 46. Each duct connector is a hollow body sized and shaped with notches so as to be complementary in shape with the open ends of the bottom panel, enabling one end of the connector to be slidably inserted into and mate with the walls at the open ends of the bottom panel 36 and close off the open ends to airflow except through each duct connector.

The fluid flow to and from the collectors shown in FIG. 1 is provided by an inlet manifold 47 via an inlet duct 48 that is coupled to the bottom duct connector and an air outlet manifold 49 connected via an outlet duct 50 that is coupled to the upper outlet duct 46. A suitable pressure source or blower (not shown) is coupled between the inlet manifold and outlet manifold to circulate the fluid flow via the collector members, and a suitable storage is provided as in conventional solar collector fluid flow systems of this type.

Each duct connector 45 and 46 therefore is a hollow body that serves as an airflow connection for the attachment of a circulating fluid flow duct to the top and bottom of the collector. In the event the duct 48 or 50 is metal, then the duct connectors 45 and 46 are preferably a dielectric to serve as a dielectric break between the two. The duct connectors 45 and 46 are shaped to allow for a duct connection anywhere along their width to avoid structural members in the support structure and are provided with an inside radius to guide the flowing fluid into and out of the fluid flow passage with a minimum of static pressure drop. The duct connectors 45 and 46 may be stamped metal or a molded dielectric material and are attached to the assembled top and bottom panels prior to attachment to the support structure.

The cover 13 includes an outer sheet 51 and an inner sheet 52 with a dead air space 53 therebetween. In practice it is advantageous, particularly from a cost standpoint, to be able to use materials other than glass that have a high degree of solar transmissivity. To this end, outer sheet 51 which is exposed to the weather is durable enough to withstand the environment, has high solar radiation transmissivity and a high resistance to ultraviolet degradation. A sheet of Tedlar, Kelwall fiberglass, or silicon-coated glass fiber has been found suitable for this purpose. In particular a sheet of Tedlar PVF polyvinyl fluoride film of 4 mil thickness has been found suitable for this purpose. The inner sheet 52 resists, or does not degrade, when exposed to the high temperatures, which could be as high as 350° F., produced in the air space above the collector plate and also has high solar radiation transmissivity. A Teflon film having a thickness of 1 mil has been found suitable for this purpose.

When the outer and inner cover sheets 51 and 52 are a film without significant rigidity, the cover 13 is constructed as an assembly that is readily fastened along the inturned top flanges 21 and 22 of the collector member with the side connecting members 54 and 55 described hereinafter. This cover 13 shown in FIGS. 6 and 7 has the outer and inner sheets mounted on an open framework that serves to hold the sheets apart and support and aline the side edges of the sheets for ready assembly and disassembly for the collector member. As shown, this framework includes a pair of spaced side members 57, spaced end members 58 and intermediate cross members 59 between and parallel to the end members.

The end connections between the side and end members are shown as mitered joints and the members 57 and 58 are each of a C-shaped cross section with the open side facing out so that the side members 57 readily insert into the slots in the side connecting members 55 and 56. The cover sheets are of the same dimension as the external dimension of the framework and are secured thereto as by an adhesive or the like.

The cover sheets 51 and 52 are connected to the top of the upper sidewalls of the collector member along their side edges with a pair of opposed left and right side connecting members 54 and 55, respectively. Each side connecting member is an elongated body, preferably by an extrusion, of a resilient thermal insulating material that runs the full length of the collector member. An elastomeric material identified as EPDM and supplied by the Pawling Rubber Corporation has been found suitable for this purpose.

Each side connecting member 54 and 55 has a flat, vertical, outer side 60 that butts against the upper sidewall with a lateral slot 61 extending throughout the length thereof so that the side connecting member slidably and removably fits over an associated inturned top flange 21 or 22 of the collector member, an inturned top flange 62 to accommodate connection of two collectors side by side using a joiner strip described hereinafter, an inside upper lateral slot 63 extending into a vertical inner side into which a side edge of the outer cover sheet 51 is slidably inserted, and an inside lower lateral slot 64 extending into a vertical inner side into which a side edge of the inner sheet 52 is slidably inserted. A longitudinal aperture 65 is shown in the lower portion of the connecting member to save material.

An alternative form of side connecting member 67, shown in FIG. 9, has a circular socket joint portion 68 in the upper surface adapted to receive the ball-type joint portion 112 hereinafter described in a snap-fit action.

With this arrangement the side connecting members serve to thermally insulate the cover sheets from the upper sidewalls of the metal top panel and the metal collector panel from the environment and allow for relative expansion therebetween. There is easy access to the absorber surface 12 for post-installation servicing, cleaning or cover replacement. The cover can be removed without interference with adjacent collectors. The cover is of a relatively inexpensive material, is readily removed for access to the interior of the collector member, and is mounted for the ready replacement of the cover.

The primary function of the glazing or cover 13 is to pass solar energy therethrough to strike the absorber surface 12 and reduce convective losses from the absorber surface back into the atmosphere. By covering the plate 11 as above described, the cover 13 also serves as the outer or primary weather membrane for the collector member so that it is possible to take advantage of the greenhouse effect and increase the collector's operating efficiency in cold weather.

The irradiation at the surface of the earth is typically short wavelength radiation that passes freely through the cover sheets and is absorbed by the selective absorber surface 12. This surface 12 warms up and reradiates long wavelength energy away from its surface. Since the cover is transparent only to short wavelength radiation and opaque to long wavelength radiation, the energy reradiated by the absorber surface is trapped in dead air space 14 between the absorber surface 12 and the cover 13 and reflected back to the absorber surface.

This greenhouse effect causes the absorber surface to operate at a much higher temperature and reduces the amount of energy reradiated away from the collector, thus improving the thermal efficiency of the collector. The thermal efficiency of the collector is also improved by using two cover sheets with the dead air space 53 between them. This dead air space serves as an insulator to reduce the amount of heat lost through the face of the cover 13 by conduction.

An alternative form of cover designated 13a is shown in FIG. 10. This cover 13a comprises a pair of parallel spaced left side and right side support and connecting members 69 and 70, respectively, and the same outer and inner cover sheets 51 and 52 above described. The two cover sheets are attached along the side support members using upper and lower transfer adhesive layers indicated at 75 and 76, respectively.

These side support and connecting members 69 and 70 perform two functions. The first is to space the cover sheets a selected distance apart, which preferably is ½ inch. This air space reduces the amount of heat lost through the cover sheets to the environment. The second function of the side support members is to provide a means of readily attaching or connecting the cover sheets to the top of the upper sidewalls of the collector member 10.

Each support and connecting member 69 and 70 is preferably generally channel-shaped and roll-formed from coiled aluminum stock. With particular reference to support member 69, this channel shape includes an intermediate wall portion 69a, a top leg portion 69b, a bottom leg portion 69c and a generally U-shaped tab or hook portion 69d extending out from the top leg portion 69b, down and back toward the intermediate wall portion, and terminating in line with the end of bottom leg portion 69c.

In a preferred procedure as shown in FIG. 11, the side support and connecting members 69 and 70 are formed as are the top and bottom collector panels 31 and 36 using a portable roll-forming machine 101 having two rolls of coiled stock 102 and 103 mounted at one end at opposite sides which pass first through a roll-forming stage 104 comprised of suitable upper and lower shaping rollers along each side of the apparatus, and then through a transfer adhesive and cover sheet adhesive applicator stage 105 having roller assemblies similar to one another along each side to accommodate the two side support and connecting members 69 and 70. The roll-formed side support and connecting members 69 and 70 will exit the roll-forming machine at a desired cover width and will enter the transfer adhesive and the cover sheet stage 105 from which the cover 13a exits.

The details of the arrangement of rollers in transfer adhesive and cover sheet applicator 105 are shown in FIG. 12. This apparatus comprises identical upper and lower roller assemblies 120 and 121 for applying transfer adhesive 75 and 76, respectively. These roller assemblies 120 and 121 are on both sides of the stage 105 to accommodate both the left and right side support and connecting members 69 and 70.

Referring to the upper assembly 120, it comprises an upper roll 123 of transfer adhesive on a backing strip that passes down around an idler roll and back up to a tape backing take-up roll 124. Rolls 122 and 124 have axes in the same horizontal plane. Idler 112 is positioned to impress or apply a pressure to the adhesive from roll 122 on top leg 69b of the associated side support and connecting member. The lower roller assembly 121 operates in the same way to impress the adhesive 76 on lower leg 69c. In this way, as the members 69 and 70 exit the roll-forming machine the transfer adhesive is applied to top and bottom surfaces thereof in a continuous manner.

In stage 105 there is an upper roller assembly 126 and a lower roller assembly 127 for each member 69 and 70. The upper roller assembly 126 is shown to have a cover sheet roll 128 that wraps around an idler roller 129 that is positioned to press the cover sheet against the adhesive. These roller assemblies 126 and 127 are downstream of the roller assemblies 121 and 122 so that, after the adhesive has been applied, the cover sheets are applied and the assembled cover 13a passes out of the machine.

Accordingly, the roll-formed side support and connecting members and the cover sheets are attached such that the user of the apparatus produces a continuously formed cover of the exact length required for each installation. After the desired length of cover exits, the cover 13a is sheared to the desired length.

The cover 13a is attached to the collector member, as shown in FIG. 10, by engaging the hook-shaped tab 69d into the outturned opening in the channel-shaped top flange 21 of the collector member. Once the cover 13 is attached to the associated collector member, warm air at approximately 200° F. is blown onto the outer cover sheet 51 until it shrinks to the desired tension. This heat shrinking of the outer cover sheet provides a drumheat-tight film cover layer. The covered collector member is now ready for installation on the support structure, which is described more fully hereinafter.

The manner of mounting or attaching each collector member 10 to an underlying support structure is shown in FIGS. 1-3 in relation to a conventional roof construction which, as shown, includes a plurality of pairs of parallel spaced, upstanding, essentially vertically arranged rafters designated 71 and 72 that have a vapor barrier 73 extending along the inside edges. Heat insulation 74 is shown filling the full depth of the space between rafters 71 and 72. A support network or parallel-spaced arrangement comprised of a plurality of purlins 77 is affixed to the top edges of the rafters as by lag screws 100. The purlins 77 are arranged in vertically spaced, horizontal rows so that they will also serve as a working ladder for the installation of the collector members onto the roof.

A pair of parallel spaced, generally T-shaped attaching members 78 are secured to the purlins and these are arranged at spaced intervals below and along both side edges of each collector member in the nature of a segmented rail-like structure. Each attaching member 78 is secured to the purlin by a bolt fastener 81 with a flat head and a washer 82. The bolt fastener 81 extends through a longitudinally extending slot 83 in the purlin and threads into a sleeve 84 in the purlin 77. The attaching member 78 shown has a laterally extending slot 83 and bolt 81 threads into a sleeve 84 in the attaching member 78. The attaching member 78 shown has a pair of opposed, laterally extending, flange portions 78a and 78b and a narrower base portion 78c. Each purlin has a plurality of the slots 83 spaced at preselected distances to locate the attaching member 78 at the correct lateral spacing for the width of the collector member.

Each of lower sidewalls 37 and 38 of the bottom panel 36 is formed with a pair of opposed, outwardly facing, back to back side channels 91 and 92 into which the opposed attaching members nest and permit longitudinal sliding movement of the assembled panels but inhibit either vertical or lateral movement thereof so as to provide an essentially floating mount or floating attachment between the collector member and the rafters or other support structure on which they are supported.

The purlin 77 preferably is made from a flat sheet of metal shaped by roll-forming into an inverted channel with a flat intermediate wall 86, depending inclined sidewalls 87 and 88, and double-thickness side edges 89.

For attachment of the collector to the support structure, the collector plate 11 is provided with an end extension 93 that breaks over the top of the ridge or apex of the roof of the building and is secured to the back side or back slope of the ridge of the roof, as by nail fasteners 94 driven into the roof structure along the back slope, as shown in FIG. 1, so that the collector 10 depends or hangs from the supporting ridge. A final ridge flashing 95 of right angle shape is shown covering the apex of the collector member.

As shown in FIG. 1, the bottom panel 36 with duct connectors 45 and 46 installed is shorter than the top panel 31 with end closures 42 and 43 installed and in the roof structure terminates between horizontally extending upper roof beams 96 and lower roof beams 97 which provide support for the top panel 31. An eave flashing strip 98 extends between the lower roof beam and top panel 31 and down to the gutter shown at 99.

As best seen in FIG. 2, the top panel 31 is further provided with a bottom end extension 203 that turns back in a hook and slidably receives a hooked end portion 98a of the flashing strip 98 to connect the two members 31 and 98 and yet allow for expansion and contraction and to keep weather elements including moisture from passing under the collector member.

SITE ASSEMBLY AND INSTALLATION

The fabrication of the collector 10 from coiled flat sheet stock is done at the job site using metal roll-forming techniques which in particular are readily portable roll-forming machines that have sets of upper and lower shaping rollers through which the sheet is passed to be formed into the shapes shown in a continuous operation. The cost of manufacture of this collector can be considerably reduced using this technique and this affords the ability to have a custom fit and quality control for each installation.

In a preferred procedure the top panel 31 with a preapplied selective absorber surface coating is roll-formed into a shape shown in FIGS. 4 and 5. The bottom end is sheared off and the end portion 203 folded back in relation to the size of the building structure and the top end is sheared off to the face of the panel and then trimmed to crease the ridge and form the panel extension 93 so that the panel will then depend from the ridge of the building.

The bottom panel 36 is then roll-formed. Both the top and bottom ends of the bottom panel 36 are sheared off approximately two feet shorter than the top panel 31. The top panel is then nested in the bottom panel and the top flanges of the bottom panel are inserted into associated top flanges of the top panel. The resulting assembly is a double-panel box-like structure that is stiff enough to be handled without buckling and is now ready for attachment of the cover 13.

For the cover 13 shown in FIGS. 1–9 the side edges of the cover sheets 51 and 52 are inserted into the lateral slots 63 and 64 in the side connecting members 54 and 55 and the top and bottom end closures 42 and 43 and top and bottom duct connectors 45 and 46 are attached. To attach the cover to the collector member the side connecting members 54 and 55 are attached to the inturned top flanges 22 and 23 by inserting slot 61 over the associated flange and using an adhesive therebetween for a weather-tight fit. In the event the alternate cover 13a shown in FIG. 10 is used, then the procedure above described is followed to complete the individual collector member.

The purlins 77 are installed horizontally across the face of the existing roof, or the face of the rafters on a new construction. They are spaced vertically to serve as a working ladder and may be shimmed to provide a totally flat surface for the collector members. The purlins are attached, preferably by lag screws, directly into the rafters on new constructions or onto the existing roof or similar existing support structure. Prior to attaching a purlin, the attaching bolt 81 is inserted through the prepunched slot 83 from the back. The eave flashing 98 is also installed prior to the installation of the collector member in place.

The installation of each collector member proceeds horizontally across the face of the purlins from one side of the roof to the other. First, the collector member is lifted into position and the extension 93 is fastened firmly to the back slope of the roof. Second, the attachment members 78 are inserted into the side channels 91 and 92 of the bottom panel and are secured to the attachment member and purlin. Then the joiner strips 106 or 111 for the form shown in FIGS. 8 and 9 are attached to complete the joint between adjacent collector members designated 10, 10a and 10b in FIG. 3.

For the cover 13a shown in FIG. 10 a joiner strip 131 of a selected width with a layer of dielectric or thermal insulating gasket 132 is installed on the tops of the adjacent side support members 69 and 70 on two adjacent collector members 10 and 10a using suitable fasteners such as sheet metal screws 133, pop rivets or the like that extend through the joiner strip, gasket and into the associated side support member. This attaches two adjacent collector members with the joiner strip spanning the space between the adjacent collector members completing the weather membrane between adjacent panels and further serves to stabilize the side support and connecting members 69 and 70. This joint arrangement also gives an additional means of securing and restraining the edges of the cover 13a by a clamping force between the joiner strip and the associated support and connecting members.

An alternative to strip 131, gasket 132 and fasteners 133 is a strip of tape such as Tedlar tape of a width similar to that of strip 131 to span the tops of the two adjacent support members and perform a similar function.

The procedure for mounting each collector member and connecting the members side by side with the joiner strip is repeated until all of the collector members are mounted on and attached to the roof.

The installation is complete once the collector has been properly flashed into the back slope of the roof and into the gutters or other suitable rain drip at the eave. The rafters behind the panels are now ready to receive insulation and the fluid flow ducts are interconnected to the air inlets and outlets in the end connector members.

Skylight windows can be created, as indicated at 140, by cutting through the top and bottom panels and closing each hole with a transparent or colored glazing. This enables a window through a working section of the collector, making it an active and passive roof-solar collector assembly.

Referring now to FIG. 14, there is shown a succession of the portions of the structure shown in FIGS. 1 and 3 as it is assembled. Beginning on the right side, portion A shows the purlins in place on the rafters. Portion B shows the bottom panel in place. Portion C shows the top panel in place. Portion D shows the cover in place and portion E shows the final construction.

From the foregoing description several features of the invention are apparent. The collector plate 11 serves as the principal portion of a weather membrane over the structure supporting the collector. The principal parts of the collector member 10 are independently movable from and do not utilize any part of the usual support structure to perform both solar energy collecting and weather membrane functions and are therefore free to expand and contract relative to their supporting structure. The attachment system then is suitable for installing the collector member 10 on a wide variety of different structures, including rafters, existing roofs, vertical walls, flat roofs and the like.

The collector member 10 above described is readily formed and cut to the required length at the job site using portable roll-forming machinery and this affords a number of economic advantages over presently known flat plate type collectors that are assembled at a factory and shipped to the point of use.

INDUSTRIAL APPLICABILITY

The above described solar energy collecting apparatus can be installed in a number of ways and collect heat for various purposes. The collector members may be installed on new structures or existing structures. The collector members may be installed on the face of the rafters or on an existing roof using the purlins and attachment members. Using the same procedure the collector members may also be installed on a vertical wall with southern exposure. Each collector member may also be installed on a frame structure that is separate from a house or like building. Each collector member may be installed horizontally on the roof instead of the vertical arrangement shown. The heat collected by the collector member may be used for space heating, domestic water heating, swimming pool water heating, clothes drying, and space air-conditioning using absorption refrigeration.

By way of example, a film found suitable for outer cover sheet 51 is a Tedlar PVF polyvinylfluoride DuPont film No. 400XRB160SE. Inner cover sheet 50 is DuPont Teflon FEP film Type A, which is a copolymer of tetrafluoroethylene and hexafluoropropylene. The transfer adhesive found suitable for use with the Tedlar film is a 3M Company product No. 9460. The transfer adhesive found suitable for use with the Teflon film is a 3M Company product No. 465.

Although the present invention has been described with a certain degree of particularity, it is understood that the present disclosure has been made by way of example and that changes in details of structure may be made without departing from the spirit thereof.

What is claimed is:

1. In solar energy collecting apparatus on a support structure, the combination comprising:
a plurality of solar collector members connected side by side, each solar collector member having:
a collector panel including an intermediate portion providing a solar collector plate with an absorber surface and a pair of opposed sidewall portions projecting up from the opposite side edges of said intermediate portion;
a solar energy transmission cover coupled to support said sidewall portions above said intermediate portion to provide an air space between said cover and said solar collector plate;
a bottom panel including an intermediate portion extending under said collector plate and a pair of opposed sidewall portions projecting up from the opposite side edges of said bottom panel intermediate portion, said bottom panel sidewall portions being fastened to said collector panel to form an airflow passage below said collector plate,
said collector panel, cover, and bottom panel of each collector member being a complete solar energy collecting entity independent of the collector panels, covers, and bottom panels of adjacent collector members,
the upper side edge portions of one collector panel being joined to the upper side edge portions of adjacent collector panels of adjacent collector members to form an imperforate weather membrane to protect the support structure from the weather in the absence of a complete cover for said one collector panel; and
mounting means between each collector member and support structure for holding said solar collector members against vertical and lateral movement relative to said support structure while leaving said collector members free for longitudinal movement relative to said support structure to permit said collector members to thermally expand and contract along their length due to temperature changes.

2. In apparatus as set forth in claim 1 wherein each of said collector panels and bottom panels is a generally channel-shaped one-piece body made of sheet metal that is continuous from end to end.

3. In apparatus as set forth in claim 2 wherein the opposed sidewall portions of said bottom panel are of greater depth than the sidewall portions of said collector panel and said collector panel nests in said bottom panel to form a generally box-like double channel structure.

4. In apparatus as set forth in claim 3 wherein the adjacent sidewall portions of each collector panel and bottom panel have top flanges that interfit with one another.

5. In apparatus as set forth in claim 1 wherein said intermediate wall providing said collector plate has transverse corrugations extending alternately above and below the plane of the flat sheet from which said top panel is formed and said bottom panel has laterally spaced, longitudinally extending ribs in the intermediate wall thereof.

6. In apparatus as set forth in claim 1 including end closures closing the opposite ends of said collector panel to close off the air space between said cover and said solar collector plate.

7. In apparatus as set forth in claim 1 including a duct connector at the ends of said bottom panel in flow communication with said airflow passage.

8. In apparatus as set forth in claim 1 wherein said absorber surface is provided by a preapplied selective absorber coating.

9. In apparatus as set forth in claim 1 including a side connecting member removably attaching each cover to the top of the associated sidewall portion of the associated collector panel.

10. In apparatus as set forth in claim 9 wherein said side connecting member is a unitary body of thermal insulating material to thermally insulate said collector panel from the cover and the collector panel sidewall portions from ambient air externally of said cover.

11. In apparatus as set forth in claim 9 wherein said side connecting members have a generally channel-shaped cross section with the open portion of said channel facing in a laterally outward direction.

12. In apparatus as set forth in claim 11 wherein each side connecting member has a hook portion extending out and down and back in from an upper leg of said channel shape adapted to hook into the open portion of a channelshaped flange at the top of the collector member.

13. In apparatus as set forth in claim 12 wherein said side connecting members are made of sheet metal.

14. In apparatus as set forth in claim 13 wherein adjacent of said side connecting members on two adjacent panels provide planar surface spanned by a common joiner strip to connect two of said collector members side by side.

15. In apparatus as set forth in claim 14 including gasket means between said joiner strip and said adjacent side connecting members and removable fasteners extending through said joiner strip gasket means and into said side support member to form a weathertight seal.

16. In apparatus as set forth in claim 9 wherein each side connecting member has a lateral slot in an outer side arranged to slidably insert over an inturned top flange extending in from the top of the collector panel sidewall portion to removably secure said connecting member to said collector panel sidewall portion, and upper and lower lateral slots in an inside surface arranged to slidably receive the side edge portions of said cover sheets whereby said cover is removably connected to said collector member.

17. In apparatus as set forth in claim 16 wherein each of said side connecting members includes a first joint portion adapted to releasably interconnect with a second joint portion by means of a common joiner strip to join two of said collector members side by side and close the joint from the environment.

18. In apparatus as set forth in claim 17 wherein said first and second joint portions are ball and socket type structures and of a resilient material to snap-fit into one another.

19. In apparatus as set forth in claim 1 wherein said cover is comprised of upper and lower cover sheets, each of a solar transmissive material, spaced from one another by a pair of parallel spaced side connecting thermal members extending along the opposite side edges of the cover sheets to space said sheets apart and above and below a dead air space, said upper cover sheet having physical characteristics that will not degrade under temperatures produced by solar energy falling on said collector plate.

20. In apparatus as set forth in claim 19 wherein said upper cover sheet is a Tedlar film having a thickness of about four mils.

21. In apparatus as set forth in claim 1 wherein said lower cover sheet is a Teflon film having a thickness of about one mil.

22. In apparatus as set forth in claim 1 wherein said bottom panel is above the plane of the support structure.

23. In apparatus as set forth in claim 1 wherein said mounting means includes:
a pair of oppositely disposed attaching members below and along the opposite side edges of an associated collector member secured to the support structure and arranged for holding said collector member against vertical and lateral movement relative to said support structure; and
connector means for suspending an associated collector member from said support structure leaving the rest of said collector member free to move longitudinally relative to said support structure to thermally expand and contract along its length due to temperature changes.

24. In apparatus as set forth in claim 23 wherein said mounting means includes:
a plurality of said attachment members arranged below and at parallel spaced intervals along the opposite side edges of said collector member, each of said attachment members having a laterally projecting male flange and being affixed at a base portion to said support structure; and
a pair of opposed, back to back, side channels formed in the lower sidewalls of said collector member nested over the sides of and slidably movable along the male flanges of said attachment members.

25. In apparatus as set forth in claim 23 wherein said attachment member includes a generally T-shaped body.

26. In apparatus as set forth in claim 23 including purlins extending across the support structure and arranged in a plurality of rows between the top and bottom of the support structure, said purlins being affixed to the support structure, each of said purlins having a slot through which a fastener extends to fasten each attachment member to said purlin after said purlin is affixed at a selected location to said support structure.

27. In apparatus as set forth in claim 26 wherein said purlin has an inverted generally channel shape with an intermediate wall portin in which said slots are formed, a pair of angularly inclined sidewall portions and a double thickness lateral flange at each end parallel to said intermediate portion to support said intermediate portion above the support structure.

28. In apparatus as set forth in claim 26 wherein said purlins have slots located selected distances apart to position the collector members on the support structure.

29. In solar energy collecting apparatus mounted on a support structure, the combination comprising:
an assembly of a plurality of similar solar collector members connected side by side, each collector member having:
a top collector panel with an intermediate portion providing a solar collector plate having a solar energy absorber surface for collecting solar energy, a pair of opposed sidewall portions projecting up from opposite side edges of said intermediate portion, and an inturned top flange portion at the top of each of said upper sidewall portions;
a solar energy transmissive core disposed above and in spaced relation to the absorber surface with a dead air space between said absorber surface and cover, the opposite side edges being detachably connected at associated inturned flange portions by means of a thermally insulating connecting member, and end closures at the ends of the dead air space of each collector member;
a bottom panel nested in each collector panel, said bottom panel having opposed sidewall portions with inturned top flange portions receiving adjacent top flange portions of said top collector panel connected along upper side edges to the upper side edges of the collector panel sidewall portions to define an airflow passage below each collector plate, and duct members at the ends of said airflow passage, said bottom panel being disposed above said support structure;
a thermally insulating joiner strip extending over the top of the associated thermally insulating connecting members of adjacent collector members joining adjacent collector members, said joiner strip, connecting members, and adjacent top collector panels forming an imperforate weather membrane to protect the support structure from the weather in the absence of a complete cover;
a pair of laterally spaced attaching members affixed to and upstanding from the support structure, each of said attaching members having a pair of inturned male flange projections leaving overhanging surface portions,
said sidewall portions of each collector panel having back to back, outwardly facing channels slidably mating with an associated of said male flange portions on said attaching members holding said collector panels against relative vertical and lateral movement while allowing said collector panels to be free to slide longitudinally,
each collector panel having an extension at one end that is suspended from the support structure leaving said collector members longitudinally free to expand and contract due to temperature changes; and
purlins extending across and in a plurality of vertically spaced rows secured to the support structure to which the attaching members are secured.

30. In apparatus as set forth in claim 29 wherein said support structure is the roof structure of a building including a top ridge, horizontally extending upper and lower roof beams, and a plurality of pairs of parallel-spaced upstanding rafters, said collector panel extension extending over the back side of said top ridge, each said collector panel having a hooked end extension opposite said one end that hooks into a complementary hooked end portion on a flashing strip adjacent the lower end of the building.

* * * * *